UNITED STATES PATENT OFFICE.

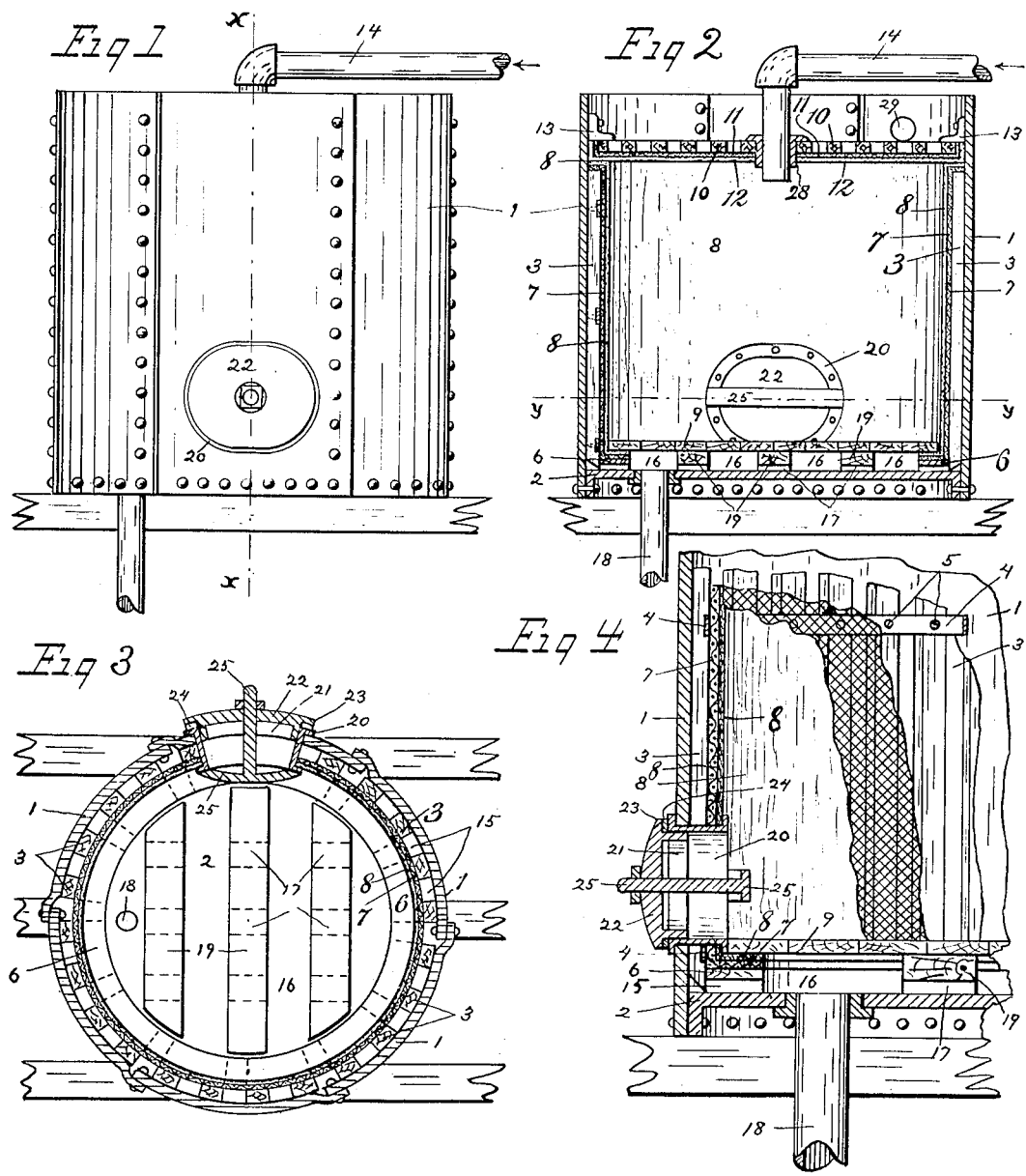

WILLIAM L. IMLAY, OF CONESTOGA, PENNSYLVANIA, ASSIGNOR TO THE WILLIAM L. IMLAY RAPID CYANIDE PROCESS COMPANY, A CORPORATION OF SOUTH DAKOTA.

FILTER.

No. 904,698.　　　Specification of Letters Patent.　　　Patented Nov. 24, 1908.

Application filed February 5, 1908. Serial No. 414,310.

*To all whom it may concern:*

Be it known that I, WILLIAM L. IMLAY, a citizen of the United States, residing at Conestoga, in the county of Lancaster and State of Pennsylvania, have invented certain new and useful Improvements in Filters, of which the following is a specification, reference being had therein to the accompanying drawing.

This invention relates to a filtering or separating tank, and is designed more especially for use with the cyanid process for extracting the cyanid solution, containing the dissolved metals from the pulverized ores or slimes as received from the lixiviator.

One object of the invention is to produce a cheap, durable and positive filter that will have a large filtering area and that will allow the liquid to pass through the filtering material at about the same speed as the unfiltered solution is delivered into the tank, thus allowing the sediment to settle to the bottom of the tank and not be stirred up again, as by my device the liquid filters through the sides and then passes off in a lateral or radial direction from the center, thus allowing the sediment to collect in a pyramidical form directly under the inlet pipe in the center of the tank, thus giving a natural slope towards the sides for the liquid to readily travel and owing to the large filtering surface thus provided the liquid will be carried off at once, and the sediment collect in almost a dry state. It is a well known fact that the present filters for this purpose will not work with a finely pulverized ore or slime as it is well known that a finely pulverized ore or slime will lie in such a dense and close mass that when it has only accumulated to the depth of a few inches no liquid can pass through it, and it will therefore be seen that by a method of filtering through the side the liquid is drained off from the surface, as the material rises in the tank and my filtering material can not become clogged as is the case when the filtering material is placed at the bottom of the tank. It will further be seen that the filtering material can be readily renewed or changed to suit different grades of ore. I have also provided a top filter so that as the tank fills and the side filters become covered with sediment the solution will be forced upward through the top filter and thus pass off through the overflow-pipe. There is also provided one or more manholes for cleaning and removing the sediment or slime by any of the well known methods. It will further be seen by my method of filtering through the sides that the sediment is collected in a much drier state than if the liquid passed through it to the bottom, and in this manner the sediment will build up in a solid mass and the lateral strain on the tank will be greatly reduced thereby.

I have here illustrated and described my invention as being constructed in combination with a metal tank, but it is understood that any suitable material or form of tank may be used and I do not confine myself to the exact construction as shown, as changes may be made in the material and arrangement of the parts without departing from the spirit of the invention.

Like figures designate corresponding parts in all the figures of the drawings.

In the drawings:—Figure 1, is an elevation showing the inlet pipe, the outlet pipe and the man-hole. Fig. 2, is a vertical section through the center, and illustrates the mode of retaining the linings and the top filter in place. Fig. 3, is a horizontal section on the line *y y* of Fig. 2, with the removable bottom removed. Fig. 4, is a portion of an enlarged vertical section, showing the method of arranging the lining and filtering material, the man-hole, and outlet pipe and liquid ducts or passages. Fig. 5, is a plan view of a portion of the top filter grate with the backing, filtering material and inlet pipe removed.

1, indicates a circular tank formed of metal plates, or other material and is provided with the flanged bottom 2, to which it is secured in the usual way. Against the inner surface of said tank 1, are placed a series of vertical slats 3, preferably of wood, and spaced at short distances apart, in which position they are retained by the hoops 4, which are secured to each slat by the screw 5, thus holding the slats in a vertical position, at equal distances apart and in close contact with the inner surface of the tank sides and extending from the tank bottom to within a short distance of the top of said tank, while the lower ends of said slats are beveled or chamfered on the rear side to form a continuous passage around said tank between said slats and the tank sides.

Upon the bottom of the tank is placed the circular sill-ring 6, with its periphery in contact with the face of said slats 3. While upon the face of said slats 3, is secured the wire screen 7, with its lower edge extending inwardly at right angles forming a flange which rests upon the upper surface of the sill-ring 6, and its upper edge extending outwardly at right angles forming a flange which rests upon the upper ends of the slats 3, forming a backing for the filtering material.

Upon the face of the screen 7, is placed the filtering material 8, which is here shown as felt, but which may be of any suitable material, and it is arranged with its lower edge extending inwardly at right angles and forming a flange resting upon the upper surface of the projecting lower flange of the wire screen 7, and having its upper edge extending outwardly at right angles and forming a flange resting upon the upper surface of the outwardly extending flange of said screen 7.

Resting upon the lower flange of the filtering material 8, is placed the removable bottom 9, which by its own weight combined with that of the sediment resting thereon forms a mud tight joint between its lower surface near its periphery and the upper surface of the circular sill 6, and it is also supported through the center by the blocks 19, placed upon the tank bottom 2. In this way the lower edges of the backing screen 7, and filtering material 8, are retained in place and the resilient nature of the filtering material 8, acts as a packing and produces a tight joint between the removable bottom 9, and said sill-ring 6.

The top filter is constructed of a circular grating 10, of wood or other suitable material upon the lower surface of which is placed the backing screen 11, with its edge flanged and secured upon the edge of said grating 10; and upon said screen 11, is placed the filtering material 12, with its edge flanged and secured upon the edge of said backing screen 11, the whole being placed within the tank 1, with the lower surface of said filtering material 12, near its periphery, resting upon the upper flange of the filtering material 8, the weight of said top filter in connection with the nature of the two resilient materials in contact with each other forming a tight joint for packing and said top filter being further held in place by the stops 13; while through the center of said top filter extends the inlet pipe 14 through the collar 28, and above the top filter with its lower edge on a level with the same is placed the overflow pipe 29.

The sill 6, is provided with the openings or ducts 15, placed at adjacent points to the spaces formed between the vertical slats 3, and communicates with the chamber 16, which is formed between the removable bottom 9, and the tank bottom 2. The blocks 19, are also provided with ducts 17, for allowing the liquid a free circulation in the chamber 16, and so out through the outlet pipe 18, which is placed in the bottom of the tank.

The man-hole for communicating with the interior of the tank may be of any well known form, but I have here shown it to consist of a flanged elliptical ring 20, extending through and embracing the tank body 1, and the edges of the filter lining, where cut away to form the opening for the man-hole. Fitting within said ring 20, is the cap ring 21, formed with the cap 22, and the flange 23, upon which is placed a packing ring 24, thus forming a water-tight joint between said cap and the edge of the ring 20. The cap 22, is pierced by a T-bolt 25, whose arms engage the opening of said man-hole with its ends resting upon the face of the outer flange of said man-hole casing 20; said bolt 25, is secured by the nut 27, screw threaded thereon.

The operation of my device is as follows:— The pulverized ores or slimes mixed with the liquid solution as received from the lixiviator is delivered into the tank by the inlet pipe 14, and upon descending to the bottom of the tank the coarser particles form a pyramid in the center of the tank, while the liquid and slime flow to the sides and against the filtering material, the liquid passing through said filtering material, between the meshes of the backing screen and entering the spaces formed between the adjacent sides of the vertical slats, through which it descends to the bottom of the tank and thence through the ducts in the sill-ring and the supporting blocks to the outlet pipe, where it is carried off. This operation continues until the tank is filled with sediment which having reduced the efficiency of the side filter, the top filter starts to operate, the liquid rising in the tank is forced up through the top filter and so out through the overflow pipe, which is placed above said top filter. If the unfiltered material is delivered into the tank at a greater speed then the liquid therefrom will naturally flow through the side filter, the tank will fill and the liquid be forced by pressure through the side and top filter at the same time. When the tank has become filled with sediment the man-hole cover may be removed and the sediment removed in any of the well known ways.

Having thus described my invention what I claim as new and desire to secure by Letters Patent is:—

1. In a filter of the class described, comprising a tank, provided with an outlet in the bottom thereof, a lateral filter spaced from the inner sides of said tank, a horizontal filter secured within and near the top of said tank and forming a joint with the top of said lateral filter, a removable bottom spaced from the bottom of said tank and forming a joint with the bottom of said lateral filter, means for backing and supporting the lateral filtering material, means for supporting and spacing said filtering material backing from the inner surface of said tank sides, means for providing and retaining a top filtering medium within said tank, means for forming a chamber within the bottom of said tank, and means for conducting the filtrate into and through said chamber.

2. In a filter of the class described, comprising a tank, provided with inlet and outlet means, a series of slats arranged against the inner side of said tank in such a way as to form spaces or ducts between their adjacent sides, stay-hoops secured to the face of said slats, a sill resting upon the surface of said tank bottom with its outer edge in contact with the face of said slats near the lower end thereof, said sill formed with transverse ducts in its lower surface, a series of spacing blocks formed with transverse ducts in their lower surface and resting upon said tank bottom, a perforated or coarsely woven backing material covering the face of said slats and formed with an inwardly flanged lower edge resting upon said sill, and an outwardly flanged upper edge resting and secured upon the tops of said slats and secured thereto, a filtering medium covering the face of said backing material and formed with an inwardly flanged lower edge resting upon the lower flange of said backing material, and an outwardly flanged upper edge resting upon the upper flange of said backing material and secured thereto.

3. In a filter of the class described, comprising a tank, an inner lateral filtering lining composed of a series of slats disposed vertically at intervals against the inner surface of said tank, and forming ducts between their adjacent sides, and arranged with their lower ends resting upon the bottom of said tank, stay-hoops secured to the face of said slats and adapted to retain them in position, a perforated or woven filter backing placed upon said slats and secured thereto, a filtering material placed upon said filter backing and secured through it to said slats, a sill formed with a series of transverse ducts and adapted to rest upon the bottom of said tank with its outer edge in contact with the face of said slats adjacent to their lower ends, a flange formed on the lower edge of the filter backing, and on the lower edge of the filtering material, and adapted to rest upon the surface of said sill, blocks formed with transverse ducts and resting upon said tank bottom, a removable bottom resting upon the upper surface of said lower filter flange, and supported by said blocks and forming a close contact with said filter.

4. In a filter of the class described, comprising a tank, a lateral filtering lining contained within said tank, a removable sill formed with a series of ducts and adapted to rest upon the bottom of said tank, a series of removable blocks formed with a series of ducts and adapted to rest upon the bottom of said tank, a flange formed upon the lower edge of said lateral filter and resting upon said sill, a removable bottom resting upon said filter flanges and supported upon said blocks, a flange formed upon the upper edge of said lateral filter, a top filter resting upon the upper edge of said lateral filter and secured with said tank near its top, an inlet pipe extending through said top filter, a man-hole extending through the side of said tank, and the lateral filter, and making a tight joint therewith, a removable cover for said man-hole, and means for securing said cover.

5. In a filter of the class described, comprising a tank, a filtering medium composed of a grating, a filter supporting medium securely placed in contact with the surface of said grating and having its edges flanged and secured thereto, a filtering medium placed in contact with the surface of said supporting medium and having flanged edges embracing the flanged edge of said supporting medium and secured to said grating through said supporting medium, the whole contained and removably secured within said tank near its upper end, and forming a tight joint with the sides of said tank, an inlet pipe extending through said grating, filter supporting medium and filtering material, an outlet pipe extending through the sides of said tank above the upper surface of said grating.

In testimony whereof I affix my signature in presence of two witnesses.

WILLIAM L. IMLAY.

Witnesses:
CHAS. H. BOWMAN,
MABEL L. LEFEVRE.